Nov. 8, 1960
J. C. F. KESSLER ET AL
2,959,570
PROCESS OF EXTRUDING COMPOSITION COMPRISING A FIBER
FORMING LINEAR CONDENSATION PRODUCT
AND A THICKENING AGENT
Filed June 10, 1955
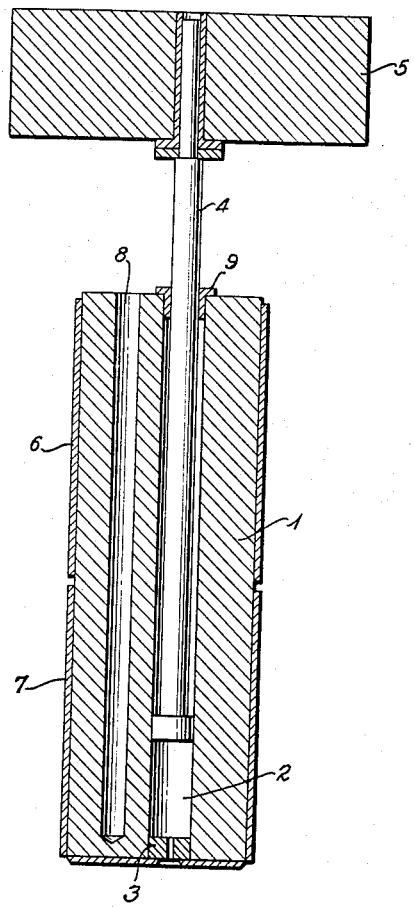
INVENTORS
JACOB CHRISTOFFEL FERDINAND KESSLER
AND HARM ROELF SPREEUWERS
BY Stevens, Davis, Miller and Mosher
ATTORNEYS

# United States Patent Office 2,959,570
Patented Nov. 8, 1960

2,959,570

PROCESS OF EXTRUDING COMPOSITION COMPRISING A FIBER FORMING LINEAR CONDENSATION PRODUCT AND A THICKENING AGENT

Jacob Christoffel Ferdinand Kessler and Harm Roelf Spreeuwers, Arnhem, Netherlands, assignors to N.V. Onderzoekingsinstituut Research, Arnhem, Netherlands, a corporation of the Netherlands Filed June 10, 1955, Ser. No. 514,666

Claims priority, application Netherlands June 30, 1954

7 Claims. (Cl. 260—77.5)

This invention relates to the manufacture of self-supporting shaped products from high molecular weight linear polycondensation products by means of extrusion. More particularly, the invention relates to the manufacture of self-supporting shaped products other than threads and films.

One of the principal objects of the present invention is to provide a new and improved method for the manufacture of self-supporting shaped products from high molecular weight linear polycondensation products by means of extrusion wherein the difficulties due to rapid changes in plasticity of these polymeric materials on melting is avoided. A further object of the invention is to provide new and improved self-supporting shaped products that are prepared by extrusion of high molecular weight linear polycondensation products such as for example linear superpolyamides. In its more specific aspects, the invention has for its object the provision of new and improved self-supporting shaped products of the kind indicated, other than threads and films.

The manner in which these and other objects and features of the invention are attained will appear more fully from the following description thereof, in which reference is made to typical and preferred procedures in order to indicate more fully the nature of the invention, but without intending to limit the invention thereby.

The manufacture of self-supporting shaped products, other than threads and films, from linear polycondensation products by means of extrusion gives rise to difficulties due to the rapid change in plasticity of those polymeric materials on melting, whereas said difficulties do not arise when polymeric substances such as cellulose acetate and polyvinyl chloride are shaped in a corresponding manner.

Attempts have been made to meet these difficulties by means of specially constructed extrusion presses. However, this solution is less attractive for the processing industry, because it necessitates procuring special equipment at heavy cost.

According to the present invention, it has been found possible to prepare an extrusion material from high molecular weight polyamides and similar polycondensation products which may be used with satisfactory results in the usual extrusion devices, the properties of the formed products practically not deviating from those of products manufactured from polyamides and the like polymeric substances without admixtures.

The process according to the present invention is characterized in that to the polymers to be extruded there is added such a proportion of a substance, up to a maximum of 2% by weight of the polymer, which substance in the same proportion so thickens in molten condition the same polymer containing up to a maximum of 2.5% by weight of water-soluble components, that the ratio between the flow rate determined by means of the extrusion plastometer according to A.S.T.M. D. 1238–52T of the unmixed polymer and the flow rate of the polymer mixed with the thickening agent amounts to at least 1.5.

This definition involves the content of a maximum of 2.5% by weight of water-soluble components in the polymer of which the flow rate ratio is to be determined, in order to arrive at the most accurate indication of the substances to be used according to the invention. As a rule, the linear polycondensation product to be processed will contain less than 2.5% by weight of water-soluble substances. In that case the flow rate ratio may at once be determined with that substance. However, if the polymer contains more than 2.5% by weight of water-soluble substances, as may be the case with polycaprolactam, then it is advisable to wash such polymeric substances prior to determining the flow rates. The substances (additives) for which the flow rate ratio is at least 1.5 will be preferably added to polymers also containing less than 2.5% by weight of water-soluble components. However, this is not necessary. In many cases these additives may also be used in polymers having a higher content of water-soluble substances.

In order to explain the matter of flow rate more fully, it should be stated that this flow rate determination is preferably carried out in an apparatus such as that shown in the accompanying drawing in longitudinal section.

This apparatus comprises a metal cylinder 1 having a length of 16.5 cm. and a diameter of 5 cm. in which a continuous cylindrical bore 2 having a diameter of 1 cm. is provided. In the lower portion of said bore a nozzle 3 having an orifice of 0.21 cm. is tightly fitted. The bore 2 also accommodates a plunger 4 whose weight is 0.1 kg., said plunger being adapted to move freely up and down within the bore. On this plunger a weight 5 of 2.06 kg. may be placed. The metal cylinder 1 is surrounded by two electric heating elements 6 and 7. A space 8 is provided in said cylinder for receiving a thermometer. The plunger 4 passes through a suitable packing gland 9.

When the determination is carried out the metal cylinder 1 with the plunger 4 removed is first heated by means of the heating elements 6 and 7 to a temperature of 240° C., whereafter 7 gr. of the polymer to be tested are introduced into the bore 2 followed by the insertion of the plunger. The plunger is kept without a load on the polymer for 3 minutes, but from time to time it is pressed down to promote deaeration of the polymer. Thereupon the weight 5 is placed on the plunger. After 2 minutes this plunger should have sunk halfway down the bore. If necessary, an additional pressure is exerted on the plunger to bring it to this position. After passing this point the polymer is given 2 minutes to flow out freely. Thereafter the polymer stream is cut off along the nozzle whereupon during the next succeeding 3 minutes the polymer then flowing out is separately collected, weighed and converted to the quantity which would have flowed out during 10 minutes. This amount expressed in grams is the flow rate.

As examples of substances which exert the desired thickening action according to the present invention may be mentioned the following:

Esters of an acid of phosphorus substituted or non-substituted by halogen, namely alkyl phosphites, such as tributyl phosphite, diethyl phosphite, dibutyl phosphite, and trichloroethyl phosphite, aryl phosphites, such as triphenyl phosphite, alkyl or aryl phosphates substituted or non-substituted by halogen, such as diethyl β-chloroethyl phosphate, phenyl di-p-chlorophenyl phosphate, trichloroethyl phosphate marketed under the trade name Flexol 3 CF, trichloropropyl phosphate marketed under the trade name Flexol CE, and ethyl di-β-chloroethyl phosphate. Other suitable additives include di-chloromethylene-m-xylene, polyallyl chloride, tetraethyl pyrophosphate, di(chloroethyl) sulphate, tri-n-butylborate, p-xylylene dichloride, glycerol trichloroacetate, di-bromomethylene m-xylene, p-di(epoxy-propoxy) benzene, di-β-chloroethyl vinylphosphonate, 2,4-dimethylol phenol, 2,4-dimethylol 6-chlorophenol and terephthalic dialdehyde. Also mixtures of these substances may be used.

All the foregoing substances reduce the flow rate of the molten polymer whereas at the aforesaid concentration of less than 2% by weight, based on the polymer, they do not soften the polymer at room temperature. They may therefore be regarded as high temperature thickening agents which have no appreciable effect on the polymer at ordinary or room temperature.

The high molecular weight polycondensation products which are very satisfactory for use in the process according to the present invention are those which are obtained when polymerizing ε-caprolactam and in which the initially-formed polymerization product is washed out to such a degree that the content of low molecular weight water-soluble components remaining therein amounts to less than 2.5% by weight, based on the polymer.

In the polymerization process one generally uses phosphoric acid or acetic acid as a stabilizer and the polymerization is carried through so far that the specific viscosity of the final polycaprolactam product measured in a solution of 1% by weight in 90% by weight of formic acid lies between 1.1 and 1.7 and preferably between 1.3 and 1.7.

Washing out the low molecular weight water-soluble components is generally carried out until the content of these components is between 1.5 and 2.5% by weight, based on the poly-caprolactam.

In addition, however, polyamides obtained from superpolyamide-forming organic diamines and dicarboxylic acids are suitable for processing in accordance with the present invention. The linear polyamides to which the present invention relates may also be defined as in the well-known publication by R. L. Wakeman, "The Chemistry of Commercial Plastics," Reinhold Publishing Co., 1947, page 257, as ". . . any long-chain synthetic polymeric amide which has recurring amide groups as an integral part of the main polymer chain. . . ." Linear polyurethanes may also be employed in like manner.

The objects which are shaped from the material prepared according to the present invention are only slightly more rigid than objects consisting of the pure polymer.

The mixing of the polymer and the thickening agent may be carried out in various ways.

It is possible to mix the substances prior to supplying them to the extrustion device. According to a preferred embodiment of the process according to the present invention polymer granules are rolled during a short time, for instance during about 30 seconds, with the required amount of the thickening agent. In this way the polymer granules are covered with a thin layer of the thickening agent and an extrusion material is obtained which may be processed in any known extrusion machine. It is also possible to add the thickening agent while the polymer is being fed to the extrusion device so that the mixture of the two is obtained en route through the extrusion device.

Profiles, thin rods, technical articles, toy articles, hollow objects, such as tubes and bottles, and other massive shapes may be easily shaped in the known extrusion machines with extrusion material prepared according to the process of the present invention.

As indicated above, in addition to polycondensation products made from a single monomeric substance such as ε-caprolactam, copolycondensation products or mixtures of these various products may be employed for processing according to the present invention.

In order to indicate still more fully the nature of the present invention, the following examples of typical procedures are set forth, it being understood however, that this description is presented by way of illustration only, and not as limiting the scope of the invention.

*Example I*

Granules of a polyamide having a specific viscosity (as defined above) of 1.4, formed by the polymerization of ε-caprolactam, obtained by conducting the polymerization in the presence of 0.1% by weight of orthophosphoric acid as a stabilizer and containing about 2% by weight of water-soluble components, were rolled during 30 sec. with 0.2% by weight of Flexol CE as the thickening agent. These granules were fed into a so-called table extruder marketed by the National Rubber Machinery. This apparatus makes it possible to extrude horizontally in the atmosphere and to take off the shaped product, namely a tube having a diameter of 25 mm. and a wall thickness of 2 mm., in a known manner by means of a drawing-off device. The temperature of the extruder was maintained at 260° C.

The extruded tube had a smooth surface and a practically cylindrical cross-section.

When the same polyamide to which no thickening agent had been added was fed to the extruder, it was not possible to extrude a tube because the polymer merged immediately on flowing out. Without a thickening agent it was not possible at any temperature to obtain a shaped product.

*Example II*

Grains of a superpolyamide having a specific viscosity of 1.6, formed by polycondensation of hexamethylene diamine and adipic acid, were continuously fed to an extrusion device, a proportion of Flexol 3 CF as thickening agent adjusted to the supply of grains being also regularly fed, said proportion being 0.45% by weight relative to the grains.

An H-shaped profile was formed which did not merge and which yielded an entirely satisfactory product when horizontally extruded through the air onto a small conveyor belt.

*Example III*

Grains of a superpolyamide having a specific viscosity of 1.1, formed by the polymerization of ε-caprolactam, obtained by conducting the polymerization in the presence of 0.2% by weight of acetic acid as a stabilizer and containing about 2% by weight of water-soluble constituents, were mixed during 30 sec. with 0.2% by weight of the tributyl ester of phosphorous acid. These grains were processed to tubes in the same manner as in Example I and also in this case very favorable results were obtained.

*Example IV*

Granules of a polyamide having a specific viscosity of 1.4, formed by the polymerization of ε-caprolactam, obtained by conducting the polymerization in the presence of 0.1% by weight of phosphoric acid as a stabilizer and containing about 2% by weight of water-soluble components, were rolled during 30 sec. with 0.5% of dichloromethylene m-xylene. With this amount of additive the flow rate ratio was 2.6.

It was found possible to extrude the thus-treated granules, in the manner indicated in Example I, to a tube having a smooth surface and a practically cylindrical cross-section.

*Example V*

Granules of a polyamide having a specific viscosity of 1.6 formed by polycondensation of hexamethylene diamine and adipic acid, and which were rolled in the manner mentioned in Example I with 0.5% by weight of triphenyl phosphite, were continuously supplied to an extrusion device of the above-mentioned type and were formed to a tube by means of said extrusion device.

A tube was obtained which had a smooth surface and a practically circular cross-section. In this case the flow rate ratio was 12.5.

Example VI

Granules of a polyamide having a specific viscosity of 1.1 formed by the polymerization of ε-caprolactam, obtained by conducting the polymerization in the presence of 0.2% by weight of acetic acid as a stabilizer and containing about 2% by weight of water-soluble components, were rolled during 30 sec. with 0.5% by weight of p-di-(epoxypropoxy) benzene. These granules were processed to tubes in the same manner as in Example I and also in this case very satisfactory results were obtained.

Example VII

Polyurethane granules of commercial quality were rolled with tributyl phosphite until they had taken on 0.5% by weight of this substance. With this quantity the flow rate ratio was 1.8 (determined at 210° C. in connection with the low melting point of polyurethane). The polyurethane used in this example was a linear polymer having a molecular weight of about 15,000 to 18,000 and was made by the condensation of hexamethylene diisocyanate and 1,4-butanediol in the well-known manner (e.g., see Rinke et al. U.S. Patent No. 2,511,544 and Catlin U.S. Patent No. 2,284,637) it being understood that neither the particular polyurethane per se nor its manner of preparation constitutes a part of the present invention.

The granules of polymer thus rolled were extruded to tubes in the manner indicated in Example I, said tubes having a practically circular cross-section.

Example VIII

Polyamide granules having a specific viscosity of 1.2, prepared by the polymerization of ε-caprolactam in the presence of 0.1% by weight of phosphoric acid and containing 10% by weight of water-soluble substances, were rolled with p-xylylene dichloride until they had taken on 1.0% by weight of this substance.

The granules of polymer thus rolled may be processed to tubes in the manner indicated in Example I, said tubes having an almost circular cross-section.

We are aware of French Patent No. 912,504, and do not wish to be understood as claiming anything disclosed or suggested therein.

While specific examples of preferred methods and ingredients embodying the present invention have been described above, it will be apparent that many changes and modifications may be made in the methods of procedure and ingredients recited without departing from the true spirit of the invention. It will therefore be understood that the examples cited and the particular proportions, ingredients and methods set forth above are intended to be illustrative only, and are not intended to limit the scope of the invention.

What is claimed is:

1. A process for the preparation of massive self-supporting shaped extrusion products of substantial cross-section from extrusion materials consisting essentially of high molecular weight fiber-forming linear polycondensation products selected from the class consisting of long chain synthetic linear polyamides which have recurring amide groups as an integral part of the main polymer chain and linear polyurethanes, said process consisting of preparing a physical mixture of (a) said polycondensation product and (b) from 0.2% up to a maximum of 2%, by weight of said polycondensation product, of a high temperature thickening agent selected from the class consisting of tributyl phosphite, diethyl phosphite, dibutyl phosphite, trichloroethyl phosphite, triphenyl phosphite, diethyl β-chloroethyl phosphate, phenyl di-p-chlorophenyl phosphate, trichloroethyl phosphate, trichloropropyl phosphate, ethyl di-β-chloroethyl phosphate, tetraethyl pyrophosphate, and di-β-chloroethyl vinylphosphonate, said high temperature thickening agent when present in the same proportion having no appreciable effect on said polycondensation product at ordinary room temperature but so thickening in molten condition, the same polycondensation product containing up to a maximum of 2.5% by weight of water-soluble components, that the ratio between the flow rate, determined by means of the extrusion plastometer according to A.S.T.M. D. 1238–52T, of the unmixed polycondensation product and the flow rate of the polycondensation product mixed with the high temperature thickening agent amounts to at least 1.5 and then rapidly extruding the resulting physical mixture of high molecular weight linear polycondensation product and high temperature thickening agent under conditions of elevated temperatures at which said mixture is molten into a massive self-supporting shaped product of substantial cross-section, thereby at least greatly minimizing difficulties due to rapid changes in plasticity of said high molecular weight linear polycondensation products per se on melting.

2. A process according to claim 1 wherein the thickening agent is admixed with the polycondensation product by rolling the latter, in granular form, with the thickening agent until the granules are covered with a thin layer of the thickening agent.

3. A process according to claim 1 wherein said thickening agent is tributyl phosphite.

4. A process according to claim 1 wherein approximately 0.5% by weight of di-β-chloroethyl vinylphosphonate is added to a linear polyamide as said thickening agent.

5. A process according to claim 1 wherein trichloroethyl phosphate is added to a linear polyamide as said thickening agent.

6. A process according to claim 1 wherein trichloropropyl phosphate is added to a linear polyamide as said thickening agent.

7. A process according to claim 1 wherein said thickening agent is triphenyl phosphite.

References Cited in the file of this patent

UNITED STATES PATENTS

| | | |
|---|---|---|
| 2,212,772 | Graves | Aug. 27, 1940 |
| 2,309,729 | Gordon | Feb. 2, 1943 |
| 2,493,597 | Rothrock et al. | Jan. 3, 1950 |

FOREIGN PATENTS

| | | |
|---|---|---|
| 912,504 | France | Apr. 29, 1946 |

OTHER REFERENCES

"Handbook of Plastics," by Simonds et al., 2nd edition (1949), pages 315–316.